Figure 6:
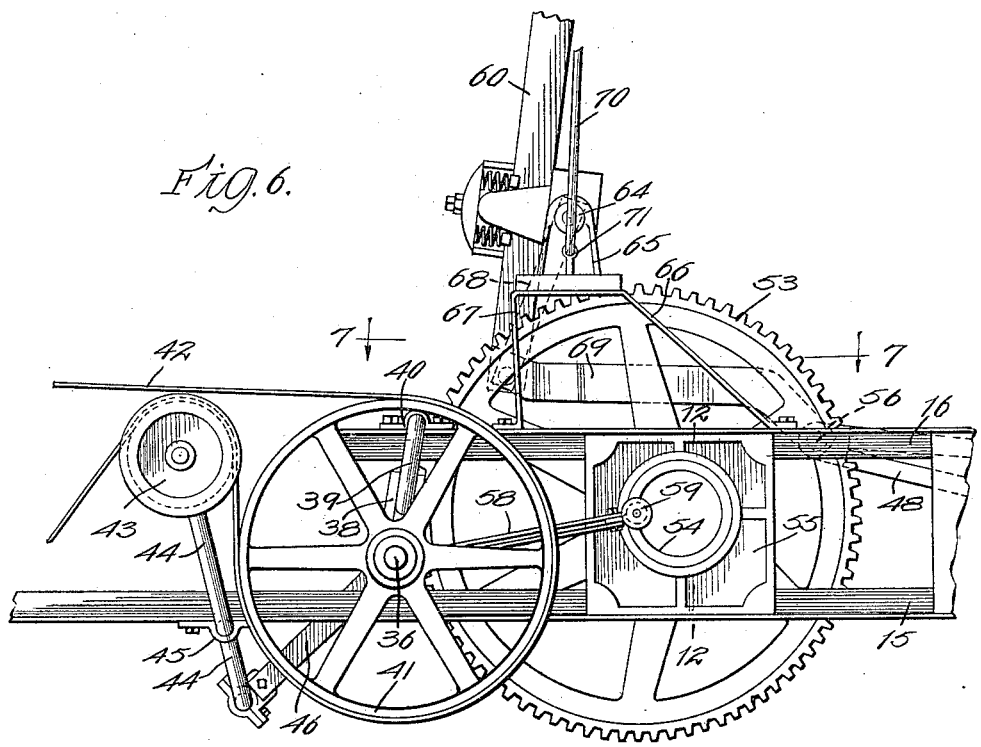

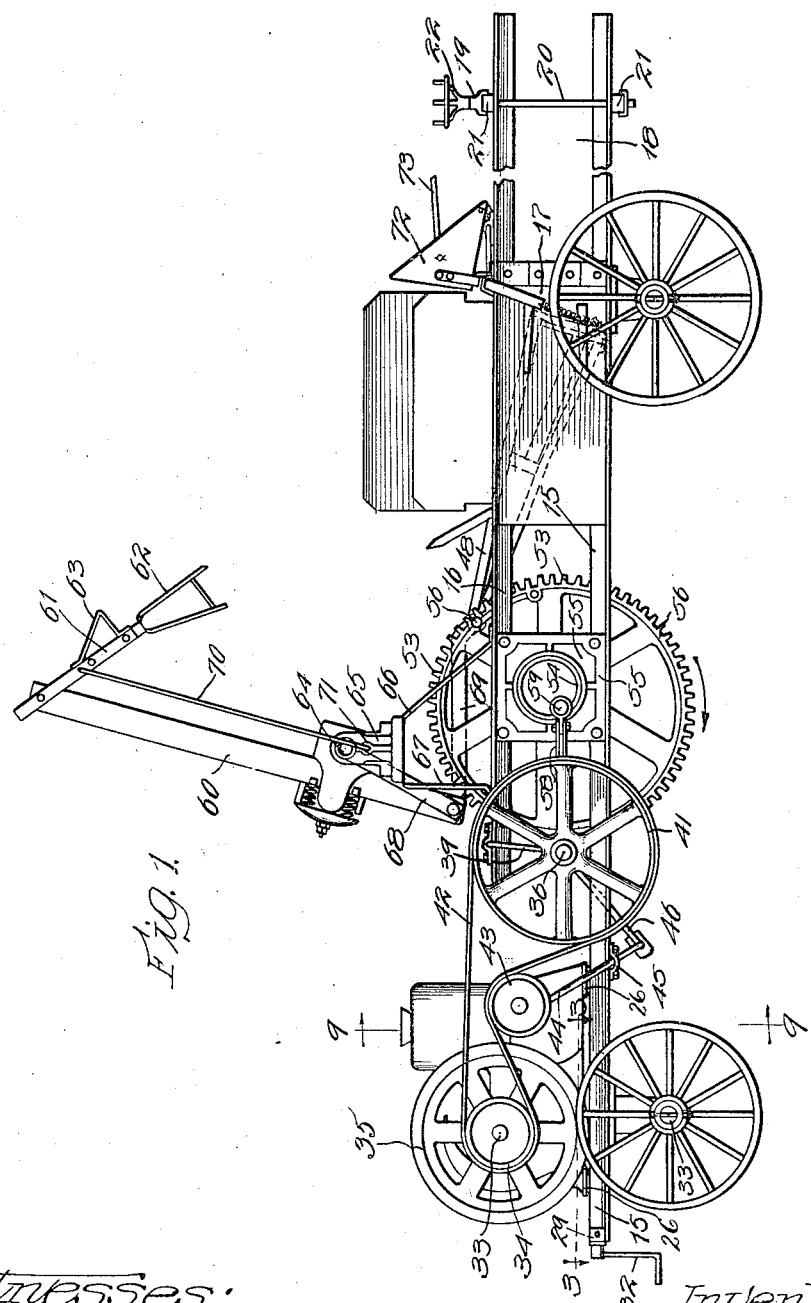

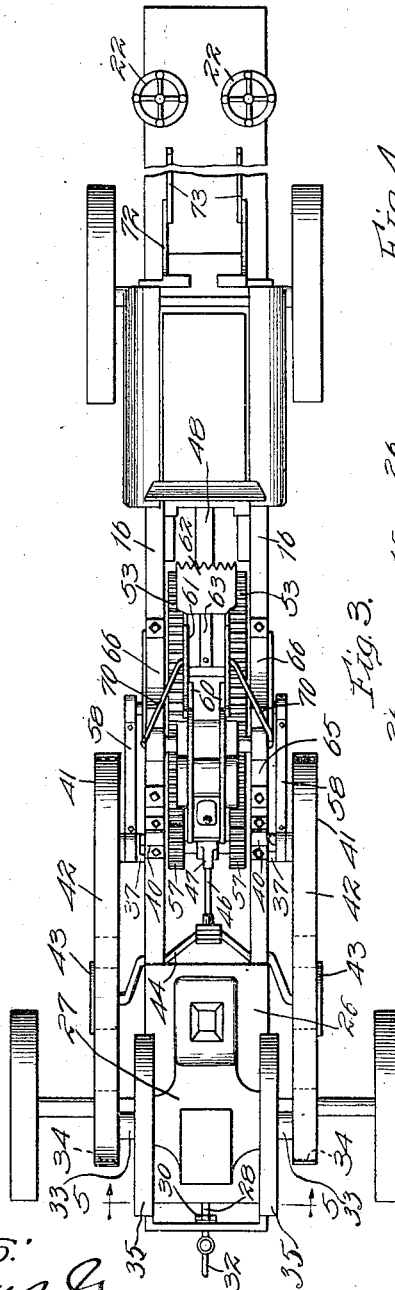

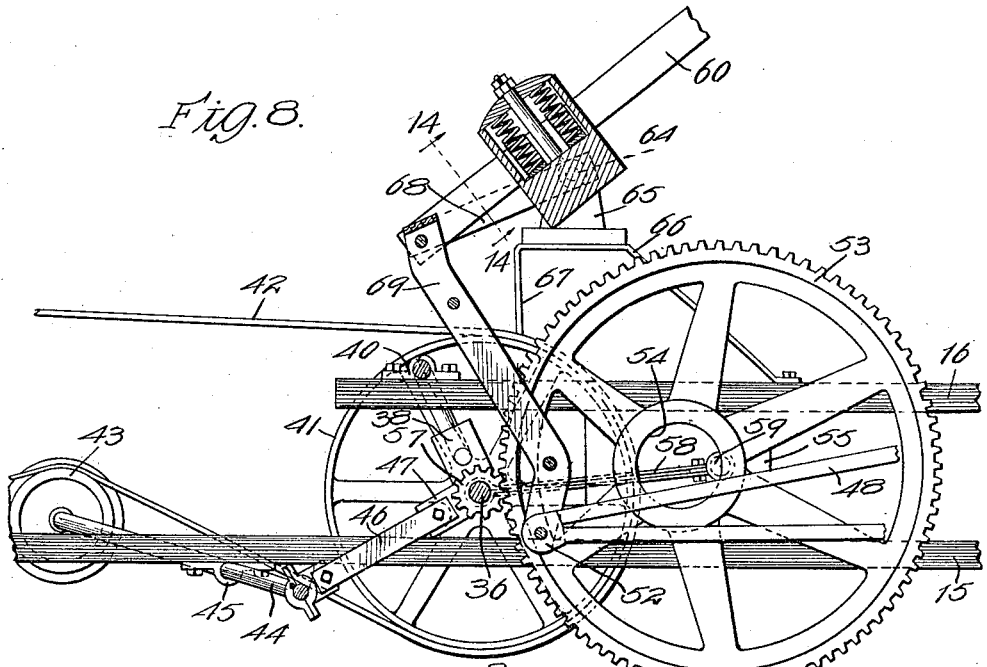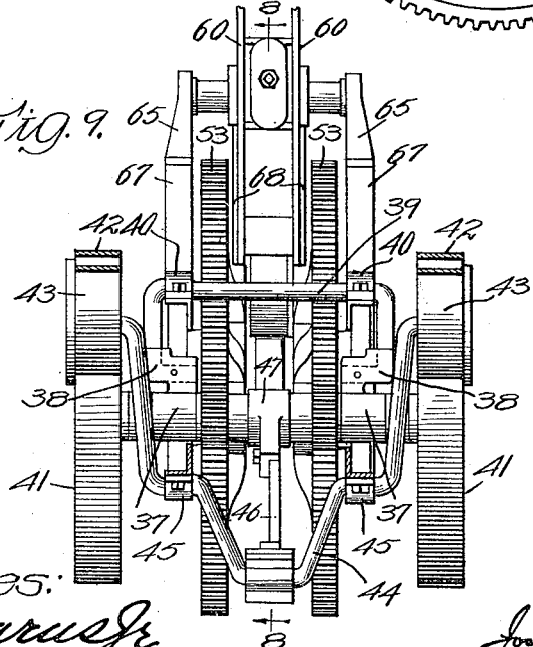

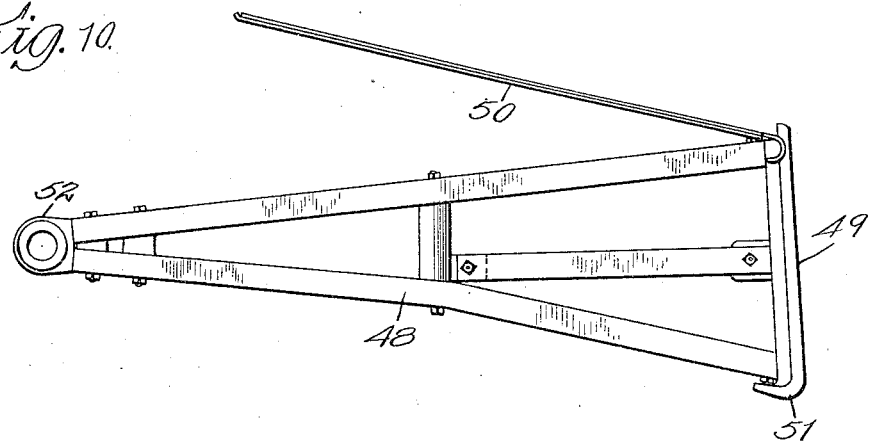
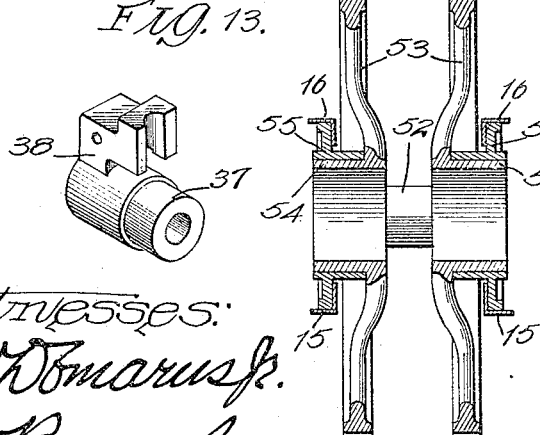
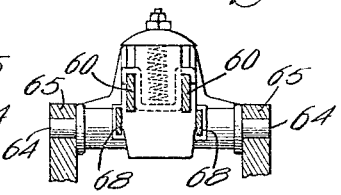
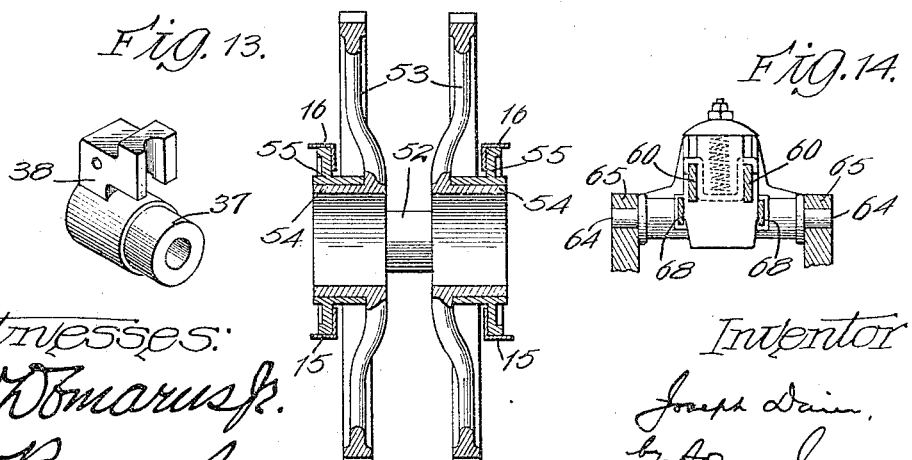

UNITED STATES PATENT OFFICE.

JOSEPH DAIN, OF OTTUMWA, IOWA, ASSIGNOR TO DAIN MANUFACTURING COMPANY OF IOWA, OF OTTUMWA, IOWA, A CORPORATION OF IOWA.

HAY-PRESS.

1,205,163.  Specification of Letters Patent.  Patented Nov. 21, 1916.

Application filed September 20, 1912. Serial No. 721,354.

*To all whom it may concern:*

Be it known that I, JOSEPH DAIN, a citizen of the United States, residing at Ottumwa, in the county of Wapello, in the State of Iowa, have invented certain new and useful Improvements in Hay-Presses, of which the following is a specification, reference being had to the accompanying drawings.

My invention relates to hay presses and has to do more particularly with the mechanism for operating the usual plunger or equivalent device employed to compress the hay in portable presses of the common type, in which the hay is fed into the baling chamber through an opening at the top, and separate charges are successively compressed and forced into a compressing or tying portion of the press, which adjoins the baling chamber, where the number of compressed charges going to make up a bale of the desired length or weight are tied together by wires before the completed bale is finally expelled from the press by the movement of later charges into the tying portion of the press. It will be apparent that in presses of this type, during the retractive stroke of the plunger and a portion of its advancing or compressing stroke, but little power is required to operate the machine. The power consuming period usually begins when the plunger has traveled one-third or one-half of the compression stroke, by which time the loose hay begins to offer resistance, and this resistance increases until the hay is formed and compressed into the shape of the bale and is pushed into and through the bale forming portion of the machine. Heretofore power operated hay presses of this type have usually been driven by steam engines, and in most cases it has been necessary to use engines of considerable horse power, generally of from ten horse power up, such as engines of the type commonly employed for operating threshers and the heavier class of machines, and in such power presses it has been the practice to equip them with a fly-wheel or balance-wheel for the purpose of storing energy during the idle portion of the plunger travel, to be delivered during the period when the plunger encounters resistance.

With the advent of the gasolene engine presses that could be successfully operated by lighter power became desirable, and it became especially desirable to associate the engine with the press on the same frame and running gear so as to make a unitary structure which would be capable of ready transportation. It has, however, been found to be impractical to use a gasolene engine of greater than six or eight horse-power in that way because of the excessive weight of the outfit which makes its transportation difficult, and, therefore, it has been recognized that a press capable of being efficiently operated by a gasolene or other engine of low power would fill an important place in the art. The use of a low power engine in connection with the ordinary power press was impracticable commercially because to gear the press back so that a lighter engine would furnish sufficient power to operate the plunger during the resistance period would materially lessen the number of strokes of the plunger in a given period and would accordingly materially decrease the capacity of the press, or the number of tons that could be baled per hour. Furthermore, the resistance offered to the plunger during the compressing period would check the speed of the fly-wheel and slow down the engine accordingly. While the engine would labor during the idle period of the plunger stroke in an effort to restore the speed of the balance-wheel, it would quite frequently happen that the balance-wheel and the engine would not be up to maximum speed when the plunger encountered the next resistance period, and, as the efficiency of a gasolene engine to deliver its rated horse power depends upon the speed, and its power rapidly diminishes with decreasing speed, the choking down or stalling of the press would frequently result.

The principal object of my present invention is to overcome the difficulties, hereinbefore mentioned, attending the use of a low power engine in connection with a hay press, but it also includes certain other objects and the attainment of other advantages which will be hereinafter set forth.

Figure 7:
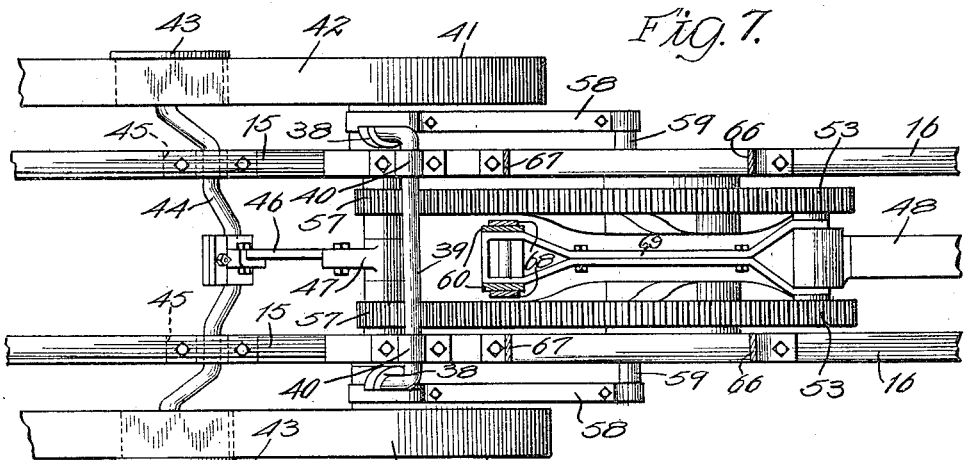

In the accompanying drawings, in which I have illustrated the embodiment of my improvements in a press of the push power type, Figure 1 is a side elevation of the press; Fig. 2 is a plan view thereof; Fig. 3 is a detail, being substantially a horizontal section on line 3—3 of Fig. 1; Fig. 4 is a detail, being a side elevation of the parts shown in Fig. 3; Fig. 5 is a cross-section on line 5—5 of Fig. 2; Fig. 6 is an enlarged detail, being a partial side elevation of the driving gears and associated parts; Fig. 7 is a partial horizontal section on line 7—7 of Fig. 6; Fig. 8 is a partial longitudinal section on line 8—8 of Fig. 9; Fig. 9 is a partial vertical section on line 9—9 of Fig. 1; Fig. 10 is a side elevation of the plunger and pitman; Fig. 11 is a plan view thereof; Fig. 12 is a vertical cross-section on line 12—12 of Fig. 6; Fig. 13 is a perspective view of one of the journal-bearings for the main drive-shaft, in which the main drive-shaft is carried; and Fig. 14 is a detail, being a cross-section on line 14—14 of Fig. 8.

Referring to the drawings, 15 indicates the lower members and 16 the upper members of the frame of the press which, in the main, is of the usual construction, and is provided with a baling chamber 17 and a compression or tying space or chamber 18, the latter being provided with a suitable tension adjusting device 19 by which the density of the bale may be regulated. In the construction shown this tension device comprises bolts 20, connecting the upper and lower members of the frame, cross-bars 21, arranged below and above the members of the frame, and hand-wheels 22 by which the upper and lower members of the frame may be drawn closer together when desired.

Near their rear ends the lower members 15 of the frame are provided with channel-bars 23, on the inside, as shown in Fig. 5, and are securely connected together in any suitable way, as by cross-bars 25, shown in Figs. 4 and 5. Said channel-bars 23 carry a frame or platform 26 upon which is mounted the engine 27. This frame 26 is movable longitudinally of the press, for the purpose of varying the tension on the driving belts, as hereinafter described, and in order to move such frame and engine longitudinally I provide said frame with a downwardly extending head or block 27ᵃ through which passes a screw 28 mounted in a cross-bar 29, the ends of which are connected to the members 15, as best shown in Fig. 3. A stop or shoulder 30 is provided on the screw 28, between the head 27ᵃ and the cross-bar 29, and a crank 32 is mounted on the outer end of the screw, as shown in Fig. 3. Thus by rotating the screw 28 the frame 26, with the engine mounted on it, may be drawn forward to tighten the belts, as hereinafter described.

33 indicates the crank-shaft of the engine which, as best shown in Figs. 1 and 2, is provided with two belt pulleys 34 at opposite sides of the machine. It is also provided with two fly-wheels 35, as shown in Fig. 2.

36 indicates the main drive shaft of the press, which is journaled in suitable bearings 37, best shown in Figs. 9 and 13, said bearings being carried by brackets 38 which are securely attached to the depending ends of a U-shaped rock-shaft 39, best shown in Figs. 7, 8 and 9. The rock-shaft is pivotally mounted near the forward ends of the upper members 16 of the frame, as shown at 40 in Figs. 7 and 8, so that its ends hang down and are adapted to swing longitudinally of the press and thereby carry the main drive-shaft 36 forward and backward.

The drive-shaft 36 carries at its end portions belt pulleys 41 which are connected by belts 42 with the belt pulleys 34, on the crank-shaft of the engine, so that by maintaining the proper tension upon said belts the main shaft 36 may be driven from the engine. The desired tension upon the belts 42 is maintained by means of idler-pulleys 43 which are mounted upon the upper end portions of a double or U-shaped crank 44, pivotally mounted intermediately of its side members in bearings 45 carried by the lower members 15 of the frame, as shown in Figs. 8 and 9. The central crank-portion of said crank 44 is connected by a connecting rod 46 and bracket 47, shown in Figs. 7 and 8, with the main drive-shaft 36, the arrangement being such that as the drive-shaft swings longitudinally of the press it will operate to rock the crank 44 and thereby swing the idler-pulleys 43 about the bearings 45 as an axis, as illustrated in Figs. 6 and 8. The belts 42 pass over the pulleys 43, as therein illustrated, and it will be apparent, therefore, that as said pulleys swing up they will maintain the tension on the belts 42, as shown in Figs. 1 and 6. When the idler-pulleys 43 swing upward they carry the belt up and cause a greater portion of the surface of the belt to bear upon the pulleys 34 and 41, and consequently increase the friction between the belts and the pulleys on which they are mounted. This occurs, as will be hereinafter explained, when the plunger meets with resistance on the compressing stroke, and consequently danger of slippage is lessened.

48 indicates the pitman element, which is connected to the plunger 49. The latter has a shield-plate 50 extending upward and forward from the plunger head 49, as shown in Fig. 10. During operation the plunger head 49 is advanced into the baling chamber, where it engages the hay and forces it into the compression chamber. It will be noted that the pitman and plunger head are rigidly connected together, and the lower margin of the head 49 is rounded, as shown at 51 in Fig. 10, forming a bearing surface on which the head may rock as hereinafter described. The purpose of the shield 50, which is somewhat flexible, is to receive and support any hay that may be thrown into the hopper while the pitman and plunger lie under it, and thereby prevent the hay from falling upon them. When the plunger is withdrawn, the hay deposited upon the shield 50 falls into the baling chamber in a position to be engaged by the plunger head on its next compression stroke. As best shown in Figs. 10 and 11, the pitman element 48 is provided, at the end opposite the head 49, with a bearing 52, by which it is pivotally connected to a pair of eccentrically mounted gears 53, best shown in Figs. 8 and 9. As shown in Fig. 12, said gears 53 are provided with journals 54 eccentrically disposed, said journals being mounted in suitable bearings provided in journal-boxes 55 secured at opposite sides of the press frame. As shown in Fig. 8, the pitman element 48 extends between the two gears, and, as shown in Figs. 1 and 6, it is connected with said gears near their peripheries, by a wrist-pin 56. The two gears 53 are set far enough apart to permit the pivoted end portion of the pitman element to pass between them as the gears rotate, as illustrated in Fig. 12.

The gears 53 are arranged between the drive-shaft 36 and the baling chamber, and they are caused to rotate, in the direction indicated by the arrow in Fig. 1, by means of pinions 57 mounted on the drive-shaft 36, and meshing with the gears 53, as shown in Figs. 7 and 8. Obviously, as the gears 53 are mounted eccentrically, it is necessary, in order to maintain a meshing engagement between the pinions 57 and said gears, that said pinions shall have move toward and from the axis of rotation of the gears 53 sufficiently to compensate for the varying distances between the peripheries of said gears and the axis thereof, and this is the purpose of mounting the drive-shaft 36 on the rock-shaft 39. Said pinions are held in mesh with the gears 53 by connecting links 58, which are pivotally connected through the bearings 37 with the drive-shaft 36 and with pins 59, concentrically mounted on the gears 53, as shown in Fig. 6, so that as the gears 53 rotate, the pinions 57 will remain in mesh with them, notwithstanding their eccentric mounting, by the shaft 36 moving longitudinally of the press sufficiently to compensate for such eccentricity. By the construction described, when the main drive-shaft is at its greatest distance from the axis of rotation of the gears 53, it will act to rotate the said gears with the greatest power, but at the slowest speed, and to secure the greatest compressing effect at such time, the pitman element 48 is connected with the peripheral portion of the gears 53 which lies nearest to the axis of rotation of said gears; and the gears 53 being between the drive-shaft 36 and the baling chamber, it follows that at the time when the gears 53 are operated with the greatest power their action upon the plunger 48 will be most effective owing to the increased leverage obtained at that time. After the pivot 56 of the plunger passes the center line, and the retraction of the plunger commences, the gears 53 will be operated with greater speed so that the plunger will be withdrawn quickly. The longitudinal movement of the drive-shaft 36 above described, is taken advantage of to maintain the tension upon the drive belt 42, by means of the connection between said shaft and the crank 44, since it will be apparent that as the shaft 36 is moved forward on the compressing stroke of the plunger, it will act to swing the pulleys 43 upward and back and not only maintain the tension of the belts 42, but also wrap said belts more closely around the pulleys 34 and 41, thereby increasing the friction upon said pulleys and making the operation of the belts more effective. Furthermore, as at this time the pulleys 41 are swung toward the pulleys 34 and in a degree travel with the belts 42, the result is a decrease in the speed of the pulleys 41 with a consequent increase in power.

By connecting the pitman element directly to the gears 53, as described, at the beginning of the compression stroke the face of the plunger occupies an inclined position, as shown in dotted lines in Fig. 1, and as the plunger advances it rocks upon its lower margin 51 until it assumes an upright position, thus giving a lever or prying effect to the plunger at the time the hay is offering the greatest resistance, and consequently adding to the efficiency of the machine.

The gears 53 also act to operate the hay feeding mechanism, as will now be described. 60 indicates the usual rocking lever, which carries a swinging arm 61 having a feeder head 62 of the usual type, and a division block dropper 63, as best shown in Fig. 1. The lever 60 is fulcrumed upon a suitable support 65, arranged above and supported upon the frame of the press by standards 66—67. 68 indicates a brace for the lever 60. 69 indicates a link connecting the rear end portion of the lever 60 with the pin 56 which connects the plunger 48 with the gears 53. 70 indicates a rod connected with the feeder-arm 61 and with a stationary support 71, for properly varying the angular position of the arm 61 with reference to the lever 60, in the usual way. By connecting the lever 60 with the gears 53, as described, advantage is taken of the variable speed of said gears to more efficiently operate the feeder, since the feeder is caused to rise rapidly and remain out of the way so as to give ample time and room to place the next charge of hay in the hopper, so that it will be carried by the feeder into the press as it descends on the backward stroke of the plunger. The feeder is so timed with reference to the movement of the plunger that it does not push the hay into the baling chamber until the plunger is practically at the end of its return stroke, thus giving a free and unobstructed opening through which the hay may be fed to the baling chamber. 72 indicates a division block support which is mounted adjacent to the feeding opening of the baling chamber and may be swung into and out of operative position by a lever 73.

The operation of my improved press has already been to a large extent described, but it may be conveniently summarized as follows: When the press is to be started the engine is first set in motion, and it is then moved forward upon the press frame by rotating the crank 32 until the belts 42 are placed under the desired tension. This sets the main shaft 36 in motion, and through it the gears 53, plunger and feeder are all driven, together with the belt tightening pulleys 43. As the gears 53 rotate they operate through the links 58 to swing the driveshaft 36 longitudinally of the press in such manner as to keep the gears 57 in mesh with the gears 53. As the plunger meets with the resistance on its compressing stroke, it is operated more slowly but with greater power, and at the same time is given a rocking movement which adds to the compressing effect, and the drive pulleys 41 are lapped more closely by the belts 42, and move toward the pulleys 34, thereby increasing the power applied during the compressing stroke as well as preventing slippage of the belt. Furthermore, the eccentric arrangement of the gears 53 provides a slow movement of the plunger during the resistance period, and a rapid movement during its non-compressing period, so that the average rate of reciprocation of the plunger is maintained at a high enough point to insure efficient capacity. By reason of the fact that the necessary gain in power at the time greater power is needed is secured by the eccentric arrangement of the gears 53, it is not necessary to provide a heavy high speeded fly-wheel with intermediate back gears, and consequently my invention reduces the number of wearing parts and greatly simplifies the machine. The eccentric arrangement of the gears 53 also serves to operate the feeding mechanism so as to cause it to rise rapidly and remain out of the way to permit the next charge of hay to be placed in position to be charged into the baling chamber after the plunger has been withdrawn.

I have shown in the drawings and have above described the pitman element and the head or plunger as connected by a rigid union, that is to say, in such way that there is no movement between the plunger or head proper and the front end or part of the pitman element, and while, for several reasons, some of which are above set forth, and for some lines of work, I prefer to have these two parts thus rigidly connected, it is to be understood that I do not restrict myself to this specific way of uniting them, as many of the features of the invention embodied in the machine as an entirety can be utilized in structures where the ordinary and well known pivotal union between the pitman and the plunger head is employed.

So far as I am aware many of the features of my improved machine hereinbefore pointed out are broadly new. For example, I believe myself to be the first to have employed in presses of this class a pitman interposed between the plunger and the power devices and to have so arranged and related the various parts that the power receiving end of the pitman rotates in a predetermined orbit and the power transmitting end reciprocates and has a relative decrease in speed and increase in power-applying efficiency while traveling through that part of its path which is at or near the end of the compression stroke, and with a relatively increased speed and with a decrease in power-imparting efficiency while traveling through the corresponding opposite parts of its path at or near the ends of its retracting stroke.

It will be seen that my pitman is not arranged and actuated as is a pitman having its power receiving end arranged to rotate around a fixed axis, as they ordinarily are. In such case the pitman at its power-imparting point travels through those parts of its path that are near the extremity of one stroke with the same speed that it travels through the corresponding opposite part of its path near the extremity of its return stroke. In my apparatus the driving mechanism and the pitman are so related that the power applying part of the pitman travels through those parts of its path which are at or adjacent to the extremity of its compression stroke with a speed much less than that at which it travels through the corresponding part of its path, at or near the extremity of the return stroke and therefore with a much greater application of power as it approaches the end of its compression stroke. The claims hereinafter made are, therefore, to be construed generically, as my invention is not restricted to the specific embodiment thereof shown and described, except in so far as it is particularly claimed. I wish it to be understood, further, that many of the improvements herein shown and described, may be applied to baling presses of other types than that illustrated, and the claims are to be read accordingly.

What I claim as my invention and desire to secure by Letters Patent is—

1. A baling press, comprising a plunger, an eccentric gear for operating the same, a circular concentrically-mounted drive pinion meshing with said gear for rotating the same, and means for driving said pinion.

2. A baling press, comprising a plunger, an eccentric gear for operating the same, a drive pinion meshing with said gear for rotating the same, a traveling support for said pinion, and means for driving said pinion.

3. A baling press, comprising a plunger, an eccentric gear for operating the same, a drive pinion meshing with said gear for rotating the same, a swinging support for said pinion, and means for driving said pinion.

4. A baling press, comprising a plunger, an eccentric gear for operating said plunger, a drive-shaft, a pinion mounted on said shaft and engaging said gear for driving the same, said shaft being movable to compensate for the eccentricity of said gear, and means for driving said drive-shaft.

5. A baling press comprising a plunger, an eccentric gear for operating said plunger, a drive-shaft, a pinion mounted on said shaft and engaging said gear for driving the same, a movable support for said drive-shaft, and means for driving said drive-shaft.

6. A baling press, comprising a plunger, an eccentric gear for operating said plunger, a drive-shaft movably supported, a pinion mounted on said shaft and meshing with said gear for driving the same, means for holding said pinion in mesh with said gear, and means for driving said drive-shaft.

7. A baling press, comprising a plunger, an eccentric gear for operating said plunger, a drive-shaft, a swinging support for said drive-shaft, a pinion mounted on said shaft and meshing with said gear for driving the same, means for holding said pinion in mesh with said gear, and means for driving said drive-shaft.

8. A baling press, comprising a rigid plunger, an eccentric gear connected therewith for actuating the same, a circular concentrically-mounted pinion meshing with said gear for driving the same, means for holding said pinion in mesh with said gear, and means for driving said pinion.

9. A baling press, comprising a rigid plunger, an eccentric gear connected therewith for actuating the same, a drive-shaft movable toward and from the axis of said gear, a pinion mounted on said shaft and meshing with said gear, means for holding said pinion in mesh with said gear, and means for driving said shaft.

10. A baling press, comprising a plunger, a pair of parallel eccentric gears connected with said plunger for actuating the same, a drive-shaft, circular concentrically-mounted pinions mounted on said drive-shaft and meshing with said gears, means for holding said pinions in mesh with said gears, respectively, and means at opposite sides of the press for driving said shaft.

11. A baling press, comprising a plunger, an eccentric gear for actuating said plunger, a pinion meshing with said gear for driving the same, said pinion being movable to compensate for the eccentricity of said gear, means for holding said pinion in mesh with said gear, a drive pulley connected with said pinion and moving therewith, a motor driven pulley, a belt connecting said pulleys, and means for automatically adjusting said belt to compensate for the movement of the pinion and its connected pulley.

12. A baling press, comprising a plunger, an eccentric gear for actuating said plunger, a pinion meshing with said gear for driving the same, said pinion being movable to compensate for the eccentricity of said gear, means for holding said pinion in mesh with said gear, a drive pulley connected with said pinion and moving therewith, a motor driven pulley, a belt connecting said pulleys, a belt tightener coöperating with said belt, and means actuated by the movement of said pinion for moving said belt tightener to keep the belt at the proper tension.

13. A baling press, comprising compressing means, a drive-shaft for actuating the same, said shaft having a pulley, a motor driven pulley, a belt operating on said pulleys, and means for automatically increasing the frictional engagement of the belt with said drive-shaft pulley during the period of compression.

14. A baling press, comprising compressing means, a drive-shaft for actuating the same, said shaft having a pulley, a motor driven pulley, a belt operating on said pulleys, and means for automatically increasing the frictional engagement of the belt with said motor pulley during the period of compression.

15. A baling press, comprising compressing means, a drive-shaft for actuating the same, said shaft having a pulley, a motor driven pulley, a belt operating on said pulleys, and means for automatically increasing the frictional engagement of the belt with said pulleys during the period of compression.

16. A baling press, comprising compressing means, a drive-shaft for actuating the same, said shaft having a pulley, a motor driven pulley, a belt operating on said pulleys, a belt tightener, and means automatically operated during the compressing period to actuate said belt tightener to lap the belt farther around said pulleys.

17. A baling press, comprising compressing means, an eccentric gear for actuating the same, a drive-shaft movable toward and from the axis of rotation of said gear, a pinion carried by said shaft and meshing with said gear, means for holding said pinion in engagement with said gear, a pulley carried by said drive-shaft, a motor driven pulley, a belt operating on said pulleys, and means for automatically adjusting said belt to compensate for the movement of the drive-shaft.

18. A baling press, comprising compressing means, an eccentric gear for actuating the same, a drive-shaft movable toward and from the axis of rotation of said gear, a pinion carried by said shaft and meshing with said gear, means for holding said pinion in engagement with said gear, a pulley carried by said drive-shaft, a motor driven pulley, a belt operating on said pulleys, a belt tightener, and means connecting said belt tightener with said drive-shaft and actuated by the movement of said shaft to adjust the belt to compensate for such movement.

19. A baling press, comprising compressing means, an eccentric gear for actuating the same, a drive-shaft movable toward and from the axis of rotation of said gear, a pinion carried by said shaft and meshing with said gear, means for holding said pinion in engagement with said gear, a pulley carried by said drive-shaft, a motor driven pulley, a belt operating on said pulleys, a belt tightener, and means connecting said belt tightener with said drive-shaft and actuated by the movement of said shaft to lap the belt further around said pulleys during the compressing period.

20. A baling press, comprising compressing means, an eccentric gear for actuating the same, a drive-shaft, a swinging support, a drive-shaft carried by said swinging support, a pinion mounted on said drive-shaft and meshing with said gear, means for holding said pinion in mesh with said gear, a swinging arm connected with said drive-shaft and actuated by the movement thereof, an idler-pulley carried by said swinging arm, a belt pulley mounted on said drive shaft, a motor driven pulley, and a belt operating on said pulleys and said idler-pulley.

21. A baling press, comprising compressing means, an eccentric gear for actuating the same, a drive-shaft between the source of power and said gear, said shaft having a circular concentrically-mounted pinion meshing with said gear, and means for driving said drive-shaft.

22. A baling press, comprising a plunger, a drive-shaft having a circular pinion, and means comprising an eccentric interposed between the pinion and the plunger, said eccentric being mounted on a stationary axis, and actuated by said pinion for operating said plunger with increased power during the compressing stroke and with greater speed and less power during the return stroke.

23. A baling press, comprising a plunger, a drive-shaft having a circular pinion, and means actuated by said drive-shaft and comprising an eccentric driven by said pinion and mounted on a stationary axis, said eccentric being interposed between the drive-shaft and the plunger and connected to the plunger for operating said plunger with increased power during the compressing stroke and with greater speed and less power during the return stroke.

24. A baling press, comprising a traveling drive-shaft, a driving pulley, a pulley carried by said drive-shaft, a belt operating on said pulleys, means for moving said drive-shaft toward the driving pulley during the compressing period, and compressing mechanism actuated by said drive-shaft.

25. A baling press, comprising a traveling drive-shaft, a driving pulley, a pulley carried by said drive-shaft, a belt operating on said pulleys, means for moving said drive-shaft toward the driving pulley during the compressing period, compressing mechanism actuated by said drive-shaft, and means for increasing the frictional engagement of said belt with said pulleys during the compressing period.

26. A baling press, comprising a plunger, and a head carried thereby, a baling chamber, said head being adapted to travel in said baling chamber, and an eccentric for rocking said head as it moves in the baling chamber on the compressing stroke.

27. A baling press, comprising a rigid plunger, and a head carried thereby, an eccentric pivotally connected with said plunger, said eccentric acting to rock said head on the compressing stroke of the plunger, and means for driving said eccentric.

28. A baling press, comprising compressing means, a rocking feeder for supplying hay to the baling chamber, an eccentrically mounted rotating member, a wrist pin on said rotating member, and links pivotally connected to the feeder and to the wrist pin for actuating said feeder from the rotating member.

29. A baling press, comprising compressing means, a rocking feeder for supplying hay to the baling chamber, an eccentrically mounted rotating member, a wrist pin on said rotating member, links pivotally connected to the feeder and to the wrist pin for actuating said feeder from the rotating member, and a circular pinion for driving said rotating member.

30. A baling press, comprising compressing means, an eccentric gear for actuating the same, a rocking feeder, links pivotally connecting said feeder with the peripheral portion of said gear for actuating said feeder, and driving mechanism for driving said gear.

31. A baling press, comprising compressing means, a drive-shaft, a pulley for driving the same, a motor driven pulley, and a belt operating on said pulleys, said motor driven pulley being movable longitudinally of the press to regulate the tension of said belt.

32. A baling press, comprising compressing means, a drive-shaft, a pulley for driving the same, a motor driven pulley, a belt operating on said pulleys, said motor driven pulley being movable longitudinally of the press to regulate the tension of said belt, and means for moving said motor driven pulley longitudinally of the press.

33. A baling press, comprising compressing means, a drive-shaft, a pulley for driving the same, a motor driven pulley, a belt operating on said pulleys, said motor driven pulley being mounted on a support movable longitudinally of the press to regulate the tension of said belt, means for moving said motor driven pulley longitudinally of the press comprising a screw mounted on the frame of the press and connected with said motor driven pulley support, and means whereby said screw may be rotated.

34. A plunger, a pitman having its power receiving end rotating around an axis, a constantly speeded circular concentrically-mounted drive-gear, and an eccentrically mounted power wheel in mesh with said drive gear and transmitting power to the pitman with increasing compression force and decreasing speed during the compression stroke, and with decreasing force and increasing speed on the return stroke.

35. In a hay press, the combination of a compression chamber, a plunger, a pitman, a power mechanism, and means between the power mechanism and pitman comprising driving and driven gear members, the driving gear member being bodily movable relative to the driven gear member while in driving connection therewith and the driven gear member being connected with the pitman at its power receiving end, said parts being arranged substantially as described to cause the plunger to move with decreasing speed and increasing power during the compression stroke and with decreasing power and increasing speed during the return stroke.

36. In a hay press, the combination of a suitable frame, a compression chamber, a power mechanism comprising a circular concentrically-mounted drive-gear, an eccentrically-mounted power wheel, a pitman having its power receiving end connected to said wheel and bodily rotated thereby with a predetermined variable speed and moving at its power transmitting point with less speed through that part of its path near the extremity of the compression stroke than through the corresponding part of its path near the extremity of its return stroke, and a plunger advanced and retracted by the said pitman.

37. In a hay press, the combination of a suitable frame, a compression chamber, a power mechanism comprising a circular drive gear, an eccentrically mounted power wheel, a pitman having its power receiving end connected to said wheel at a point traveling in an orbit extending around the axis of the wheel, with a predetermined speed and moving at its power transmitting point with less speed through that part of its path near the extremity of the compression stroke than through the corresponding part of its path near the extremity of its return stroke, and a plunger advanced and retracted by the said pitman.

38. In a hay press, the combination of a suitable frame, a compression chamber, a plunger, a power mechanism comprising a circular drive gear, an eccentrically mounted power wheel and a continuously speeded circular driving wheel, a pitman rigidly connected to the plunger at its power transmitting point and having its power receiving end pivotally connected eccentrically to the said power wheel, said parts being constructed and arranged substantially as set forth, whereby the plunger is caused to move through that part of its path near the extremity of the compression stroke with less speed than through the corresponding part of its path near the extremity of the return stroke.

39. A baling press, comprising a plunger, an eccentric gear for operating the same, said eccentric gear being mounted on a fixed pivot, a drive pinion meshing with said gear for rotating the same, a traveling support for said pinion, and means for driving said pinion.

40. A baling press, comprising a plunger, an eccentric gear for operating the same, said eccentric gear being mounted on a fixed pivot, a drive pinion meshing with said gear for rotating the same, a swinging support for said pinion, and means for driving said pinion.

41. A baling-press, comprising a plunger, an eccentric gear for operating the same, said gear being mounted on a stationary axis, a drive pinion meshing with said gear for rotating the same and movable toward and from the axis thereof, and means for driving said pinion.

42. A baling-press, comprising a plunger, an eccentric gear for operating the same, said gear being mounted on a stationary axis, a drive pinion meshing with said gear for rotating the same and movable toward and from the axis thereof, means for holding said pinion in mesh with said gear, and means for driving said pinion.

43. A baling-press, comprising a plunger, an eccentric gear for operating the same, a circular concentrically-mounted drive pinion meshing with said gear for rotating the same, means for holding said pinion in mesh with said gear, and means for driving said pinion.

44. A baling-press, comprising compressing means, an eccentric gear for actuating the same, a driving gear meshing with said eccentric gear, one of said gears being movable toward and from the axis of the other as they rotate, and means for driving said driving gear.

45. A plunger, a pitman having its power receiving end rotating around an axis, a constantly-speeded drive-gear, and a power-wheel eccentrically mounted on a stationary axis, said power-wheel being in mesh with said drive-gear and transmitting power to the pitman with increasing compression force and decreasing speed during the compression stroke, and with decreasing force and increasing speed on the return stroke.

46. A baling-press, comprising compressing means, an eccentric gear for operating the same, a drive-pinion meshing with said gear for rotating the same and movable toward and from the axis thereof, a shaft mounted in stationary bearings, and means connecting said shaft with said pinion for driving the same.

JOSEPH DAIN.

Witnesses:
JOSEPH BROWNING,
J. D. BROWNING.

Copies of this patent may be obtained for five cents each, by addressing the "Commissioner of Patents, Washington, D. C."

It is hereby certified that in Letters Patent No. 1,205,163, granted November 21, 1916, upon the application of Joseph Dain, of Ottumwa, Iowa, for an improvement in "Hay-Presses," errors appear in the printed specification requiring correction as follows: Page 3, line 33, strike out the word "have"; page 7, line 74, claim 37, and line 90, claim 38, after the word "circular" insert the words *concentrically-mounted;* and that the said Letters Patent should be read with these corrections therein that the same may conform to the record of the case in the Patent Office.

Signed and sealed this 23d day of January, A. D., 1917.

[SEAL.]          F. W. H. CLAY,

*Acting Commissioner of Patents.*

Cl. 100—3.